United States Patent [19]

Leibrock et al.

[11] Patent Number: 4,728,347

[45] Date of Patent: Mar. 1, 1988

[54] APPLICATION OF WATER TO PARTICULATE MATTER IN A GAS STREAM TO FACILITATE SEPARATION OF THE SAME

[75] Inventors: John E. Leibrock, Button Willow; Willie F. Rutledge, Taft, both of Calif.

[73] Assignee: Excel-Mineral Company, Inc., Goleta, Calif.

[21] Appl. No.: 568,890

[22] Filed: Jan. 6, 1984

[51] Int. Cl.⁴ .............................................. B01D 53/14
[52] U.S. Cl. ........................................ 55/227; 55/235; 55/240; 261/118
[58] Field of Search .................... 55/84, 223, 225, 235, 55/240, 227, 257 C, 93, 94; 261/108, 118

[56] References Cited

U.S. PATENT DOCUMENTS

| | | | |
|---|---|---|---|
| 2,452,859 | 11/1948 | Moody | 261/108 |
| 3,138,441 | 6/1964 | Krantz | 55/227 |
| 3,138,442 | 6/1964 | Krantz | 55/227 |
| 3,475,881 | 11/1969 | Arnold et al. | 55/223 |
| 3,675,397 | 7/1972 | Deacon | 55/227 |
| 4,444,697 | 4/1984 | Gater et al. | 261/118 |

FOREIGN PATENT DOCUMENTS 0858897  1/1961  United Kingdom ............. 55/257 C

Primary Examiner—Charles Hart
Attorney, Agent, or Firm—Edward D. O'Brian

[57] ABSTRACT

The removal of particulate matter from a gas stream through the use of a separator in which the weight of the particulate matter aids in its separation can be improved by wetting the particulate matter. Preferably the gas stream is caused to flow under turbulent conditions through a restricted portion of the apparatus used while streams of water are directed into the gas mixture being treated.

5 Claims, 4 Drawing Figures

APPLICATION OF WATER TO PARTICULATE MATTER IN A GAS STREAM TO FACILITATE SEPARATION OF THE SAME

BACKGROUND OF THE INVENTION

The invention set forth in this specification pertains to the application of water to particulate matter in a gas stream in order to facilitate the separation of the particulate matter from the gas stream by a process in which the weight of the particulate matter aids in the separation. More specifically the invention is concerned with a new and improved apparatus for applying water to a particulate matter in a gas stream and to a process involving the application of the water to such particulate matter in such a stream.

Virtually everyone is familiar with the apparent constantly recurring problem of the minimization of atmospheric pollution resulting from particulate matter being discharged along with gas streams into the ambient air. A large number of different expedients have been adopted and used for the purpose of minimizing the pollution resulting from various different types of gasborne particles being discharged into the atmosphere. Many different types of filters and electrostatic precipitators such as Cottrell precipitators have been utilized for the purpose of separating such particles before they are discharged into the ambient.

For economic reasons it is often considered preferable to utilize various different processes for separating such particles in which the weight of the particles separated aids or facilitates their separation. Many different types of equipment which are effective to advance separation because of the weight of the particles separated are known. An understanding of the invention does not require a discussion of such separators. Normally these separators utilize either gravity, centrifucal force or both in order to achieve a separation of entrained particles from within a gas stream. At times they utilize in addition other methods for removing such particles.

Although, known equipment for separating particulate matter by a process in which the weight of the particulate matter aids in the separation are, in general, suitably satisfactory in their intended utilization problems have been encountered with such items of equipment. Specifically they are not as efficient as is normally desired in removing comparatively small, colloidal or almost colloidal and somewhat larger particles from a gas stream to be discharged to the ambient. As a result of this the applications of such separators using gravity or centrifugal force or both has been somewhat limited. As one might expect quite a number of efforts have been directed towards improving the ability of such separators to remove particles from a gas stream.

SUMMARY OF THE INVENTION

A broad objective of the present invention is to improve the efficiency of the removal of particulate matter from gas streams to be discharged to the air utilizing equipment which relies upon the weight of the particulate matter to aid in the separation of the particulate matter from the gas stream. More specifically the invention is intended to provide a new and improved apparatus for applying water to a particulate matter in a gas stream so as to substantially coat the particles of said particulate matter with water. This has the effect of increasing the weight of such particles so that their separation of gravity of centrifucal force is facilitated.

A further objective of the present invention is to provide an apparatus as noted which can be easily and conveniently manufactured at a comparatively nominal cost, which is relatively simple to use, which is capable of being employed over prolonged periods with little, if any, maintenance and which is effective for its intended purposes. The invention is also intended to provide a process for applying water to a particulate matter within a gas stream which can be carried out utilizing the apparatus indicated in the preceding brief discussion. It is also intended to provide a process as noted which can be easily and conveniently practiced and which is effective for its intended purposes.

Those objectives of this invention pertaining to this invention are achieved by providing an apparatus for applying water to particulate matter in a gas stream, said apparatus having a vertically extending conduit and water distribution means for introducing water into said conduit in which the improvement comprises: the inlet to said conduit being located above the outlet from said conduit, said conduit including a section located between said inlet and said outlet within which water is introduced into a gas stream by said water distribution means, said water distribution means including horizontally extending tray means for holding water located adjacent to said section and opening means leading from said tray means into the interior of said section through which water can flow, said opening means and said section being shaped so that substantially all of a gas stream flowing through said conduit is contacted by water from within said tray means.

Those objectives of the present invention apply to a process of applying water to a particulate matter are achieved by providing a process for applying water to particulate matter within a gas stream which comprises: moving said gas stream downwardly through a conduit, a portion of which has an elongated, slot-like configuration and has sides in a turbulent manner, flowing water into the gas stream with said portion of said conduit substantially equally along the length of said conduit so that the water moved into said portion of said conduit contacts the turbulent gas stream within said portion of said conduit, and thereafter separating particulate matter from said gas stream by a process in which the weight of the particulate matter aids in the separation of said particulate matter.

BRIEF DESCRIPTION OF THE DRAWINGS

Because of the nature of this invention it is best more fully explained with reference to the accompanying drawings in which.

Figure 1:
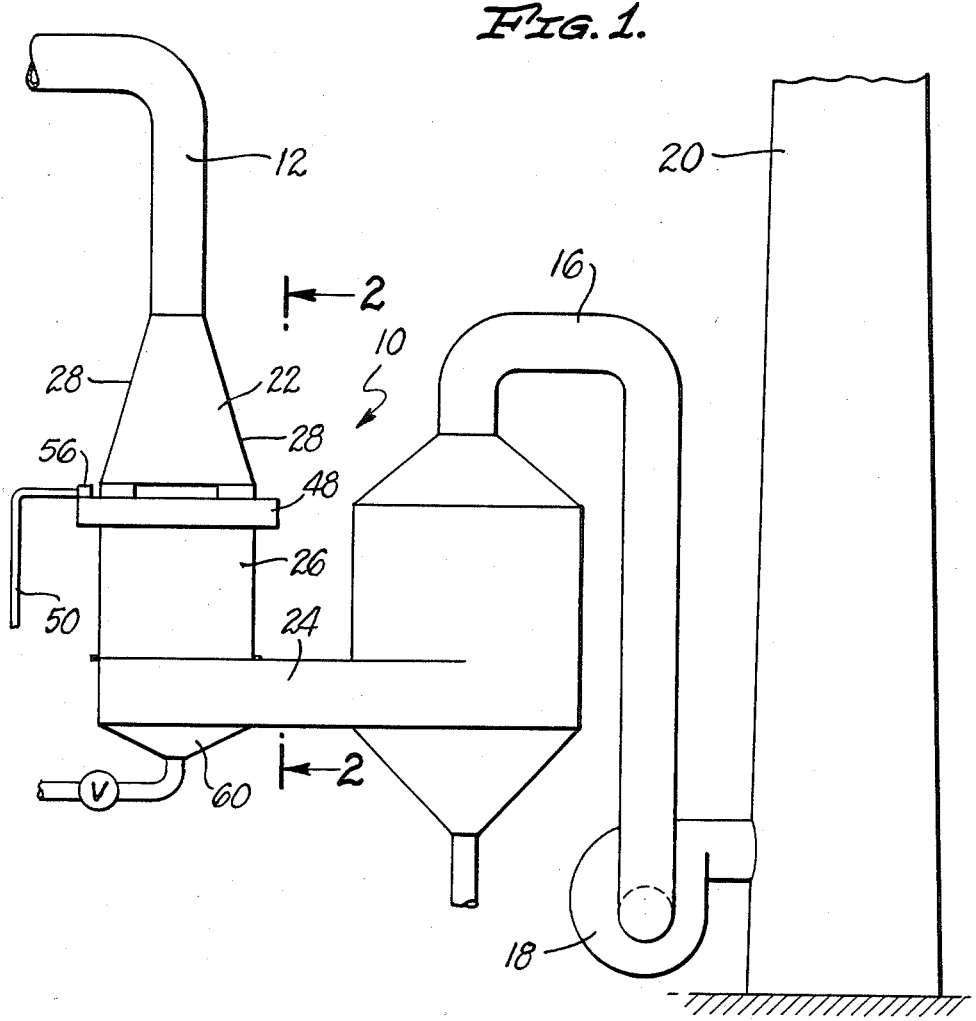
FIG. 1 is a diagrammatic view indicating a preferred utilization of the present invention.

The accompanying drawings are primarily intended for use in explaining the concepts or principles of this invention as are set forth and defined in the appended claims. Because of this the accompanying drawings are not to be taken as illustrating any precise piece of equipment at any precise scale. The principles or concepts embodied within the illustrated structure as described subsequently in this specification can be embodied within other differently appearing, differently constructed apparatus through the use or exercise of routine skill in the field of the treatment of particulate matter within gas streams so as to remove such particulate matter from these streams. For this reason the invention is not to be considered as being limited to the precise structure illustrated and described.

DETAILED DESCRIPTION

In the drawings there is shown an apparatus 10 in accordance with this invention which is utilized between an appropriate conventional conduit 12 for conveying a gas stream containing particulate matter from any source of such a gas stream and a conventional separator 14. This separator 14 is intended to remove particulate matter from the gas stream conveyed through the conduit 12 before this gas stream is discharged through another conduit 16 and a fan 18 to a conventional stack 20 employed to discharge the gas stream to the ambient air.

At this time it is considered that the gas stream conveyed through the conduit 12 can be of any source or origin which results in particulate matter capable of being wetted with water being present within the gas stream. Normally the particulate matter will be quite fine, essentially of a colloidal or nearly colloidal character. The particles of particulate matter present will normally at least be minus 200 mesh standard Tyler screen size and will usually be minus 325 mesh standard Tyler screen size in dimension. It is considered that the best results are achieved in utilizing the apparatus 10 with a gas stream which contains finely divided hydrophilic clay particles such as sericitic clay particles. Such particles are readily wetted so as to increase their weight as the apparatus 10 is used.

It should also be noted that the invention is not limited to any particular type of separator used as the separator 14. This particular separator 14 can be of known conventional type construction which permits comparatively heavy particles to separate out of a gas stream. It may be of such a character that centrifucal force either alone or combined with gravity serves to accomplish a desired degree of segregation or separation so as to reduce the amount of particulate matter which is ultimately discharged through the stack 20. This amount will normally be dependent upon normal air pollution regulations in effect when the apparatus 10 is used. At times it will be permissible to vent the gas discharged from the separator 14 directly to the ambient.

The apparatus 10 includes an inlet 22 connected to the conduit 12 and an outlet 24 leading horizontally into the separator 14 so as to serve as the inlet to the separator 14. A central section 26 of this apparatus 10 is enlarged as will be apparent from the drawings so as to be of an elongated character. This section 26 has downwardly and outwardly extending top walls 28 which are separated by an inverted V-shaped divider or baffle 30 serving to define two downwardly directed divergent gas flow channels 32 which receive gas from the conduit 12. These channels 32 lead to two elongated slot-like portions 34 of the section 26 having parallel opposed sides 36 which are located in the same horizontal plane (not shown).

The section 26 is provided with downwardly directed walls 38 located so as to extend vertically downwardly from the two sides 36 which are furthest remote from one another. This section 36 also includes two sloping walls 40 converging downwardly towards one another directly beneath the portions 34. These sloping walls 40 lead to a centrally located slot-like elongated throat 42 defined by two walls 44. The throat 42 and the walls 40 are preferably as long as the portion 34. The walls 38 are provided with bottom flanges 46 which can be utilized in connecting them to the outlet 24.

Figure 4:
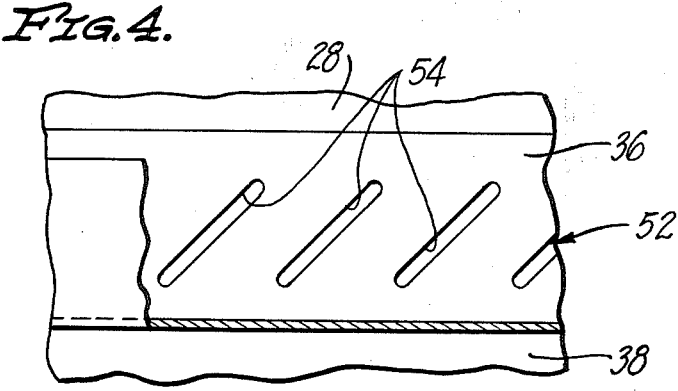
FIG. 4 is a partial cross-sectional view at an enlarged scale taken at line 4—4 of FIG. 3.
Figure 2:
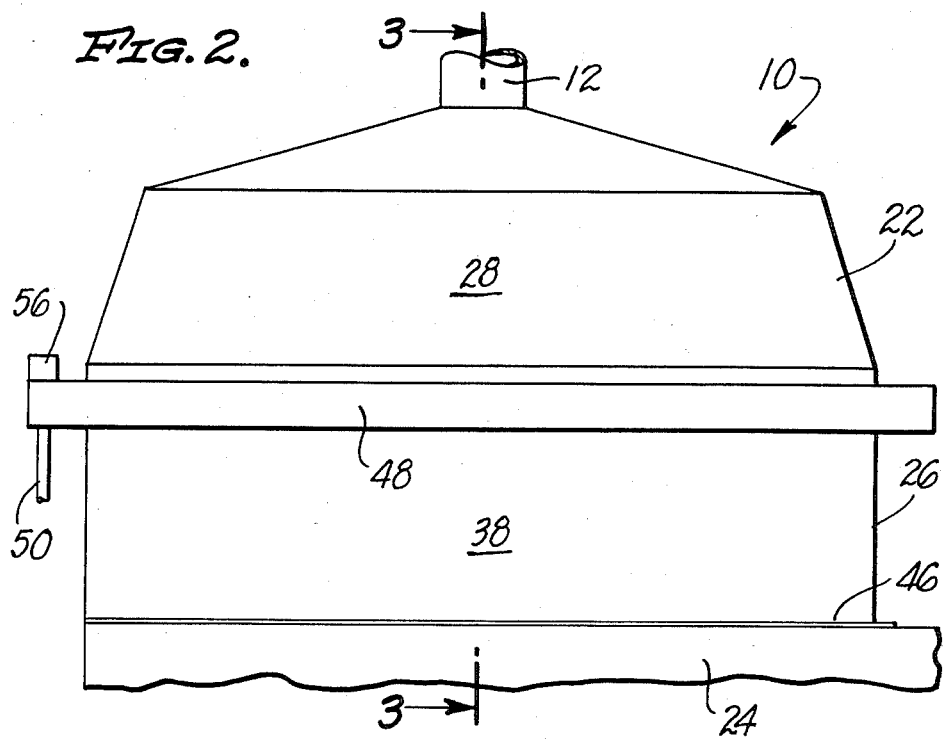
FIG. 2 is a view corresponding to a cross-sectional view taken at line 2—2 of FIG. 1 showing a side elevation view a of a presently preferred embodiment or form of an apparatus of this invention.
Figure 3:
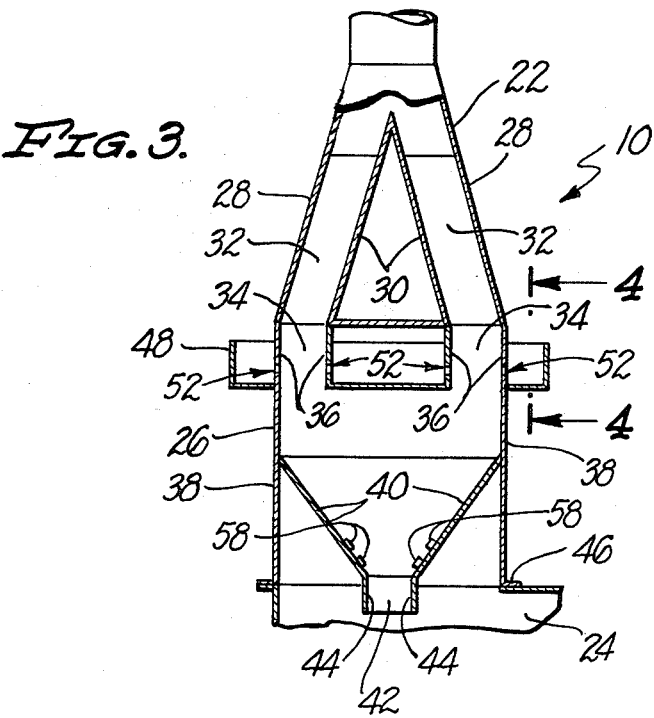
FIG. 3 is a partial cross-sectional view taken at line 3—3 of FIG. 2.

A tray 48 is located around the section 26 generally adjacent to portions 34. It is noted that this tray 48 extends generally between the two portions 34. It is horizontally located and is employed to supply water from a water source such as a supply line 50 to any of four different series 52 of horizontally extending openings 54 extending in a horizontal path. These openings 54 may be conventional circular openings or even openings which, in effect, define a single, elongated slot for practical purposes. It is considered preferrable, however, that each of the openings 54 be of the same size and shaped as shown in FIG. 4 of the drawings. These openings 54 extend diagonally and are parallel and equally spaced from one another.

If desired an conventional automatic water control 56 can be mounted on the tray 48 for the purpose of maintaining the water level in the tray slightly above the height of the openings 54. A convention valve (not shown) can be utilized in lieu of the control 56 though this is not preferable.

During the use of the apparatus 10 a gas stream as indicated having entrained particulate matter is supplied through the inlet 22 as the tray 48 is supplied with water through the use of the control 56. The entering gas mixture will be deflected into the channels 32 by the baffle 30. Because of the configuration and orientation of the sides 28 and the baffle 30 this gas will move in a turbulent matter or under turbulent conditions as it passs downwardly through the channels 32 and then through the portions 34. As it goes through these portions 34 water will flow through the openings 54 so as to tend to wet all particles within the gas stream.

When the openings 54 are of a preferred configuration as indicated in the preceding discussion the water will be supplied through them at varying heights along the lengths of the portions 34. It is considered that this is beneficial in tending to create turbulent conditions generally within these portions 34 and shortly beneath them. Such turbulent conditions are considered in being helpful in make sure that any particles present are throughly and uniformly wetted.

The dampened gas stream containing moistened particles will, of course, tend to move downward from the portions 34 through the throat 42. As this occurs any water which has not been taken up within the gas stream will fall against the sloping walls 40 and thus will flow as a result of gravity so as to be cascaded into the gas stream passing through the throat 42. Although it is not considered necessary it is possible to locate bumps 58 on the walls 40 for the purpose of breaking up any water flowing in this manner.

The gas stream passing through the throat 42 will, of course, then move generally toward the outlet 24. A sump 60 is preferably located in the outlet 24 beneath the throat 42 for the purpose of collecting any water which is not to be taken up in the gas stream and any particles which are too heavy to be entrained within the gas stream at this point before the stream is passed to the separator 14.

Preferably the sides 36 of the portions 34 should be spaced relative to one another so that the widths of the portions 34 are collated with respect to the normal water level within the tray 48 so that the streams of water emitted from the openings 54 will at least meet midway between the sides 36 of the portions 34 so as to avoid any possibility of particles passing through the apparatus without being wetted. It is considered that preferred results are achieved when the streams from the opposed openings in the sides 36 of the portions 34 impinge upon one another so as to facilitate the creation of turbulent conditions generally within these portions 34 in order to facilitate wetting of the particles present.

The particles which have been wetted as described in the preceding will normally be of such a weight as a result of their being wetted that they can be easily and conveniently separated by the separator 14. The use of the apparatus 10 has the effect of improving the efficiency of a separator such as the separator 14 by facilitating the removal of a higher portion of particulate matter then would have been possible without the apparatus 10.

I claim:

1. An apparatus for applying water to particulate matter in a gas stream, said apparatus having a vertically extending conduit and water distribution means for introducing water into said conduit in which the improvement comprises:

the inlet to said conduit being located above the outlet from said conduit, said conduit including a section located between said inlet and said outlet within which water is introduced into said gas stream by said water distribution means, said section of said conduit has an elongated shape having ends and includes an internal divider having an inverted V-shaped cross-sectional configuration extending between the ends of said section and dividing said section into two spaced parallel portions having an elongated narrow, slot-like configuration, each of said portions having opposed sides, said water distribution means including horizontally extending tray means for holding water located adjacent to said section and opening means leading from said tray means into the interior of said section through which water can flow, the portions of said section adjacent to said opening means are of a narrow, slot-like configuration and have opposed sides, and said opening means comprise a series of openings located adjacent to one another and extending in a horizontal path along the length of said portions, said opening means and said section being shaped so that substantially all of a gas stream flowing through said conduit is contacted by water from within said tray means, said conduit is shaped so as to create turbulent flow within said gas stream generally within said section, such turbulent flow serving to promote the wetting of particulate matter flowing through said conduit.

2. An apparatus as claimed in claim 1 wherein:

said openings are diagonally extending, slot-like openings located parallel to and equally spaced from one another, said openings being shaped and spaced so that water is supplied to the interior of said portion of said conduit during the use of said apparatus through each of said openings at varying heights along the length of said portion.

3. An apparatus as claimed in claim 1 wherein:

said opening means comprises two separate series of said openings, one of said series being located so as to extend along one of said sides, the other of said series being located so as to extend along the other of said sides.

4. An apparatus as claimed in claim 1 wherein:

there are two series of said openings leading into each of said portions, one of said series being located on one of the walls of each of said portions the other of said series being located on the other of walls of each of said portions.

5. An apparatus as claimed in claim 4 wherein:

said openings are diagonally extending, slotlike openings located parallel to one another and equally spaced from one another, said openings being shaped and spaced so that water is supplied to the interior of said portion of said channel during the use of said apparatus at varying heights along the length of said portion.

* * * * *